US008184454B2

(12) United States Patent
Mao (10) Patent No.: US 8,184,454 B2
(45) Date of Patent: May 22, 2012

(54) WIRELESS POWER TRANSMITTING APPARATUS (75) Inventor: Shau-Gang Mao, Taipei (TW)

(73) Assignee: National Taipei University of Technology, Taipei (TW)

(*) Notice: Subject to any disclaimer, the term of this patent is extended or adjusted under 35 U.S.C. 154(b) by 442 days.

(21) Appl. No.: 12/330,521

(22) Filed: Dec. 9, 2008

(65) Prior Publication Data
US 2009/0303693 A1 Dec. 10, 2009

(30) Foreign Application Priority Data

Jun. 9, 2008 (TW) ............................... 97121394 A (51) Int. Cl.
*H05K 9/00* (2006.01)
(52) U.S. Cl. ........................................................ 361/818
(58) Field of Classification Search .................. 361/730, 361/752, 800, 816, 818, 704, 707, 715, 719, 361/720, 690, 688, 641, 627; 307/104, 159, 307/151; 320/108
See application file for complete search history.

(56) References Cited

U.S. PATENT DOCUMENTS

| | | | | |
|---|---|---|---|---|
| 5,057,968 A * | 10/1991 | Morrison | ...................... | 361/700 |
| 6,411,261 B1 * | 6/2002 | Lilly | ............................. | 343/756 |
| 6,438,984 B1 * | 8/2002 | Novotny et al. | ............. | 62/259.2 |
| 6,512,494 B1 * | 1/2003 | Diaz et al. | ...................... | 343/909 |
| 6,615,074 B2 | 9/2003 | Mickle et al. | | |
| 6,967,462 B1 | 11/2005 | Landis | | |
| 7,172,196 B2 * | 2/2007 | Randall | ........................... | 273/237 |
| 7,212,110 B1 | 5/2007 | Martin et al. | | |
| 7,253,571 B2 | 8/2007 | Kang et al. | | |
| 7,314,447 B2 * | 1/2008 | Park et al. | ...................... | 600/459 |
| 7,839,654 B2 * | 11/2010 | Choi | ............................. | 361/792 |
| 7,918,799 B2 * | 4/2011 | Haveri | ........................... | 600/459 |
| 2001/0038339 A1 | 11/2001 | McKenzie | | |
| 2001/0053677 A1 * | 12/2001 | Schiffer | ......................... | 455/128 |
| 2003/0020477 A1 * | 1/2003 | Goldstein | ...................... | 324/415 |
| 2003/0117786 A1 * | 6/2003 | Chang et al. | .................... | 361/818 |
| 2004/0263420 A1 * | 12/2004 | Werner et al. | .................. | 343/909 |
| 2005/0087599 A1 * | 4/2005 | Ward et al. | ..................... | 235/451 |
| 2005/0104678 A1 * | 5/2005 | Shahparnia et al. | ............ | 333/12 |
| 2006/0092093 A1 * | 5/2006 | Choi et al. | ..................... | 343/909 |
| 2007/0030661 A1 * | 2/2007 | Morris et al. | .................... | 361/818 |
| 2007/0097620 A1 * | 5/2007 | Leech et al. | ................... | 361/687 |
| 2007/0139294 A1 * | 6/2007 | Dunn et al. | .................... | 343/909 |
| 2007/0191075 A1 * | 8/2007 | Greene et al. | .................. | 455/572 |
| 2007/0242444 A1 * | 10/2007 | Ju | .................................. | 361/818 |

(Continued)

FOREIGN PATENT DOCUMENTS

GB 2389720 12/2003

(Continued)

*Primary Examiner* — Lisa Lea Edmonds
*Assistant Examiner* — Xanthia C Cunningham
(74) *Attorney, Agent, or Firm* — Winston Hsu; Scott Margo (57) ABSTRACT A wireless power transmitting apparatus for remotely transmitting energy is implemented with a closed metal housing and a plurality of conductive plates disposed within the closed metal housing. With the aid of a high impedance between the closed metal housing and the conductive plates, a surface having the high impedance is formed on both the closed metal housing and the conductive plates for constraining electromagnetic power within the closed metal housing from dissipating and being consumed. The wireless power transmitting apparatus is not merely able to effectively and uniformly restrict electromagnetic field energy to the closed metal housing with the aid of the high impedance, but is also be able to raise a power transmitting efficiency between a power emitting device and a power receiving device.

28 Claims, 11 Drawing Sheets

U.S. PATENT DOCUMENTS

| | | | |
|---|---|---|---|
| 2007/0297159 A1* | 12/2007 | Gilliland | 361/818 |
| 2008/0116847 A1* | 5/2008 | Loke et al. | 320/108 |
| 2008/0161886 A1* | 7/2008 | Stevenson et al. | 607/60 |
| 2008/0169910 A1* | 7/2008 | Greene et al. | 340/10.34 |
| 2009/0002949 A1* | 1/2009 | Pawlenko et al. | 361/707 |
| 2009/0039828 A1* | 2/2009 | Jakubowski | 320/106 |
| 2009/0067198 A1* | 3/2009 | Graham et al. | 363/8 |
| 2009/0160262 A1* | 6/2009 | Schmidt et al. | 307/104 |
| 2009/0243397 A1* | 10/2009 | Cook et al. | 307/104 |
| 2011/0050382 A1* | 3/2011 | Baarman et al. | 336/221 |
| 2011/0075377 A1* | 3/2011 | Paquette et al. | 361/709 |

FOREIGN PATENT DOCUMENTS

| | | |
|---|---|---|
| GB | 2389767 | 12/2003 |
| GB | 2399466 | 9/2004 |

* cited by examiner

WIRELESS POWER TRANSMITTING APPARATUS

BACKGROUND OF THE INVENTION

1. Field of the Invention

The present invention relates to a wireless power transmitting apparatus, and more particularly, to a wireless power transmitting apparatus for transmitting power from a power emitting device to a power receiving device.

2. Description of the Prior Art

For electronic products charged by combining devices including conventional wires and transformers, power of the electronic products may merely be transmitted by using specific apparatuses fitting specifications of the electronic products. Therefore, while a user buys a power-consuming electronic product, he or she has to buy charging devices corresponding to the bought power-consuming electronic product for serving as media of transmitting power, and it indicates significant inconveniences for the user. For accommodating such a user in charging the bought electronic product, some wireless power transmitting technologies come out.

Primary existing wireless power transmitting technologies are implemented with inductance coils or radio wave propagation. While the wireless power transmitting technologies are implemented with inductance coils, power are transmitted by low-frequency transformation between magnetic energy and electric power; however, only a significantly small amount of power may reach the inductance coils as receiving power, and it indicates that most of power dissipates in the air while the distance between the inductance coils for power transmission increases. Besides, since a transmitting frequency of the inductance coils is usually inconsistent with a receiving frequency of an electronic product for receiving power transmitted from said inductance coils, additional inductance coils having a consistent receiving frequency with the transmitting frequency of the inductance coils for transmitting power have to be disposed within the electronic product for power transmissions. However, the popular electronic products are usually required to possess small weight and compact size, and the inductance coils fail in meeting requirements of a qualified power transmission ratio, locations on the electronic products for the inductance coils are thus limited significantly.

Wireless power transmitting technologies implemented with radio wave propagation, for example, the technology of radio frequency identification (RFID), transmit power with the aid of low-frequency inductance coils or high-frequency wave beams, where power transmission using the low-frequency inductance coils in the wireless power transmitting technologies is the same with power transmission related to inductance coils mentioned above. The high-frequency wave beams for transmitting power carry power to an electronic product located a couple of meters away and equipped with power receiving circuits. However, a supposition, under which the power receiving device is located at an unknown location, has to be followed while the high-frequency wave beams are used for carrying power, an emitting antenna is required to emit electromagnetic beams to whole surroundings so that the power receiving device, which is included by the electronic product, can receive the carried power of the electromagnetic beams. In other words, the emitting antenna has to emit power to omni-direction so that the electronic product is able to receive required power. While an emitting antenna having high directivity is used for emitting the above-mentioned high-frequency wave beams, the electronic product is able to receive power with a high efficiency; however, it is also getting expensive in designing the receiving circuit of the electronic product, and feasible locations of the electronic product for receiving the emitted power also meet more limitations.

Figure 1:
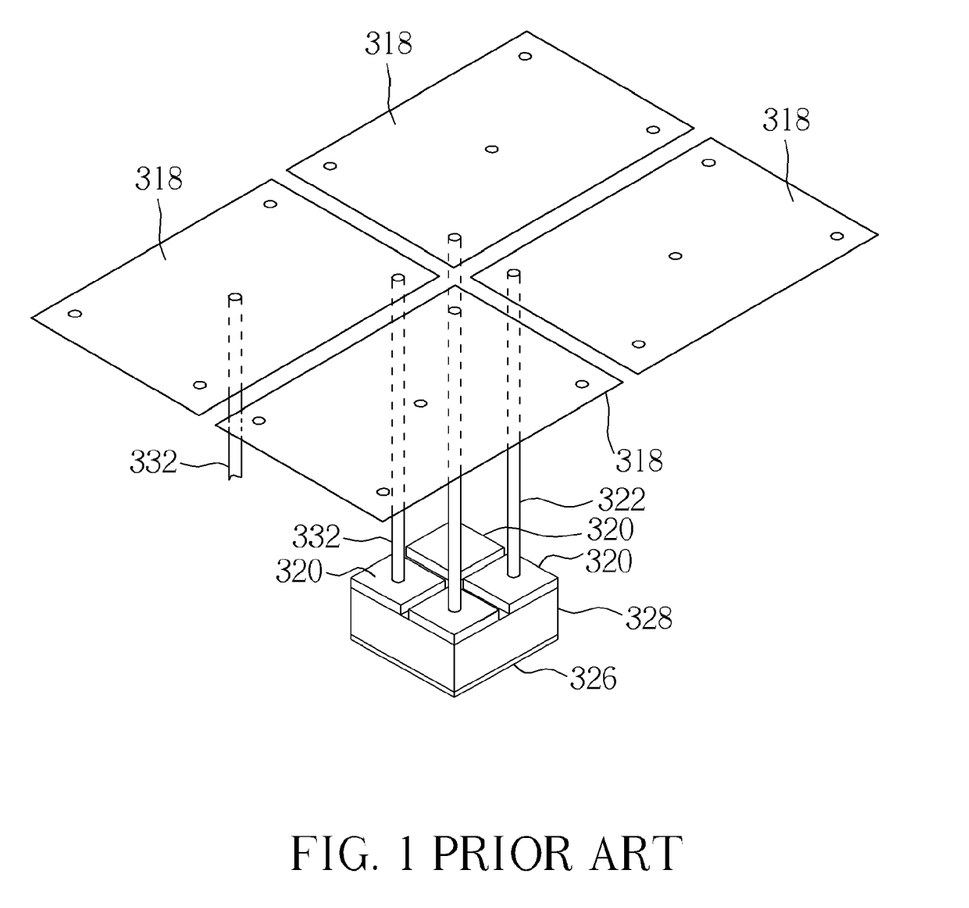
FIG. 1 and FIG. 2 illustrate a resistive surface disclosed in US Patent Publication No. 2007/0139294.
Figure 2:
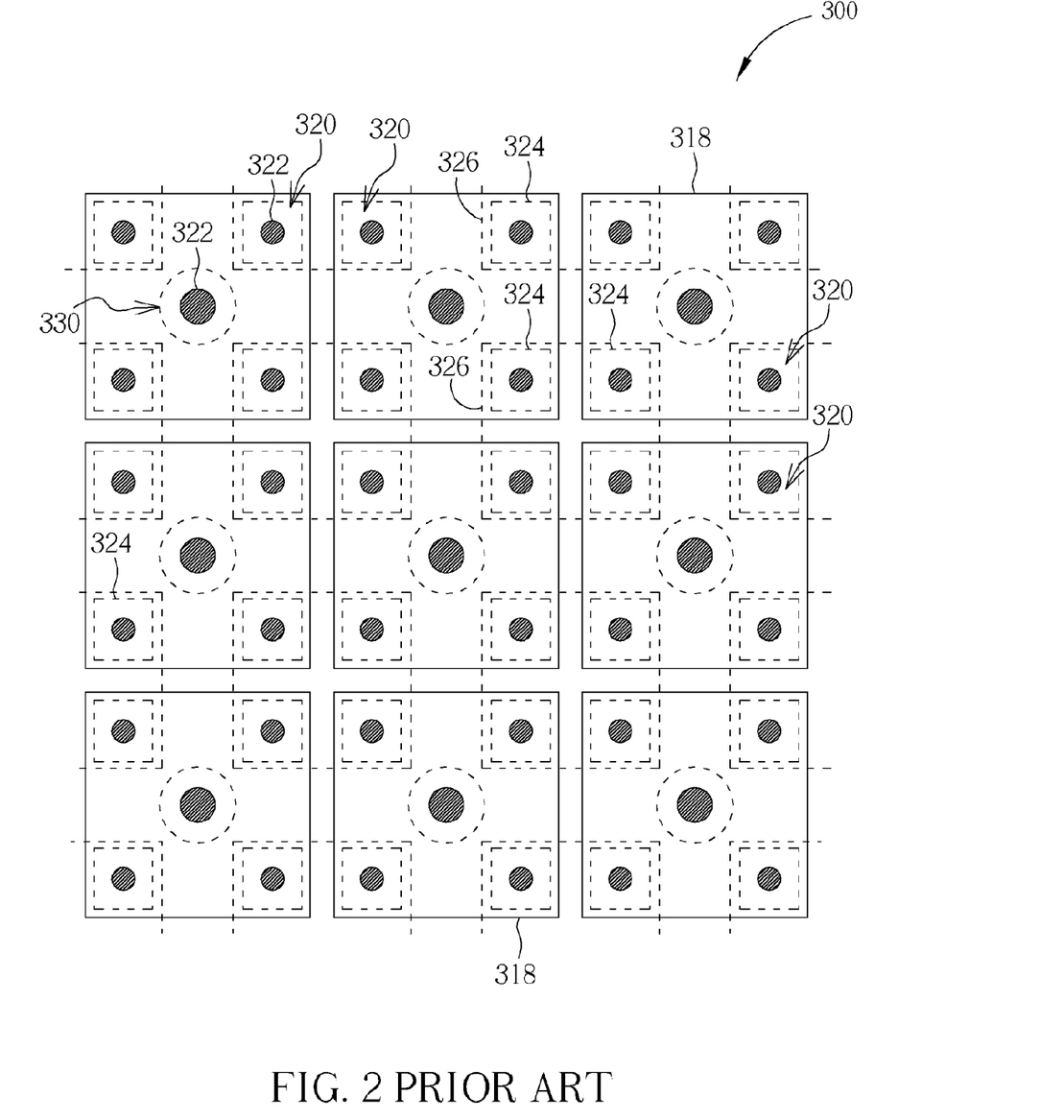

Please refer to FIG. 1 and FIG. 2, both of which illustrate a resistive surface disclosed in US Patent Publication No. 2007/0139294. While the disclosed resistive surface is used on a housing of a wireless power transmitting apparatus, power transmitted from the emitting antenna may be effectively restricted within a specific space. As shown in FIG. 1, a plurality of electrically conductive plates 318, a plurality of capacitors 320, a plurality of conductive via 322 and 332, an electrode 326, and a dielectric 328 together form a high impedance surface, where necessary discharges are performed with a conductive via 322 between each electrically conductive plate 318 and a corresponding capacitor 320. As shown in the top view of FIG. 2, on the high impedance surface 300, high impedance is generated by both the capacitor 320 and the inductor 330 of each the electrically conductive plate 318 for preventing electromagnetic power from dissipating. Note that the conductive via 322 is disposed at a center of the inductor 330. However, the high impedance surface 300 has to be implemented with large amounts of conductive via 322 and 332 so as to bring a larger volume and an expensive fabrication cost of the wireless transmitting apparatus having the housing the high impedance surface 300.

SUMMARY OF THE INVENTION

The claimed invention discloses a wireless power transmitting apparatus. The power transmitting apparatus comprises a sealed metal housing, a plurality of duplicate-distributed conductor slices, at least one power emitting device, and at least one power receiving device. The sealed metal housing has an irregular geometric shape. The plurality of duplicate-distributed conductor slices is disposed on a plurality of inner surfaces of the sealed metal housing. The at least one power emitting device is disposed at an inner side of the sealed metal housing.

The at least one power receiving device is disposed at the inner side of the sealed metal housing for receiving transmitted power from the power emitting device.

These and other objectives of the present invention will no doubt become obvious to those of ordinary skill in the art after reading the following detailed description of the preferred embodiment that is illustrated in the various figures and drawings.

DETAILED DESCRIPTION

To overcome significant power dissipation of the wireless power transmission in the prior art, and to relieve the expensive fabrication cost, the large volume, and technical bottlenecks of the wireless power transmitting apparatus, the present invention discloses a wireless power transmitting apparatus for delivering power from a power transmitting device to a power receiving device. The wireless power transmitting apparatus of the present invention is primarily implemented with a sealed metal housing having an irregular and unspecific geometric shape, and with specific polygon-shaped conductive slices disposed on inner surfaces of the sealed metal housing so that high impedance against electromagnetic waves is generated on the inner surfaces of the sealed metal housing. With the generated high impedance, dissipation of electromagnetic waves is efficiently prevented so that a power receiving device disposed at an arbitrary location inside the sealed metal housing is capable of efficiently receiving power emitted from a transmitter of the wireless power transmitting apparatus of the present invention.

Figure 3:
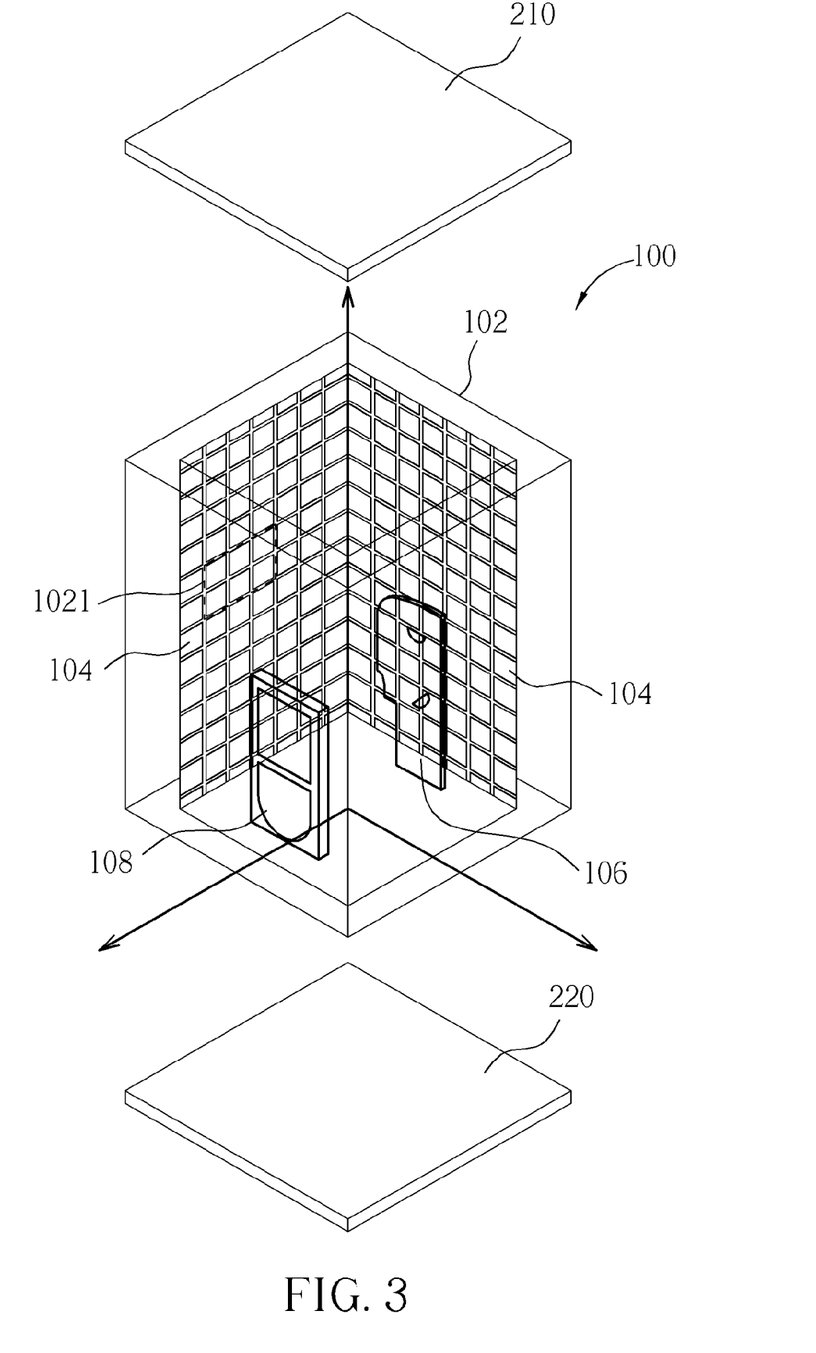
FIG. 3 is a schematic diagram of a wireless power transmitting apparatus implemented with a quadrilateral pillar-shaped housing according to a preferred embodiment of the present invention.

Please refer to FIG. 3, which is a schematic diagram of a wireless power transmitting apparatus implemented with a quadrilateral pillar-shaped housing according to a preferred embodiment of the present invention. As shown in FIG. 3, the wireless power transmitting apparatus 100 includes a sealed metal housing 102, a plurality of duplicate-distributed conductor slices 104, and a power emitting device 106. As shown in FIG. 3, the sealed metal housing 102 is a quadrilateral pillar-shaped housing. The plurality of conductive slices 104 are disposed on a plurality of inner surfaces on a plurality of side walls included by the sealed metal housing 102. The power emitting device 106 is disposed inside the sealed metal housing 102, and is insulating from the sealed metal housing 102. A power receiving device 108 is also disposed inside the sealed metal housing 102, for receiving power emitted from the power emitting device 106 inside the sealed metal housing 102. Besides, the sealed metal housing 102 further includes an upper case 210 and a lower case 220, both of which are illustrated in forms of a blow chart, At least one among the upper case 210 and the lower case 220 is disposed on the sealed metal housing 102 in a detachable manner so that the power receiving device 108 can be disposed inside the sealed metal housing 102. The upper case 210 and the lower case 220 are polygon-shaped structures and are symmetric with each other in shape.

Figure 4:
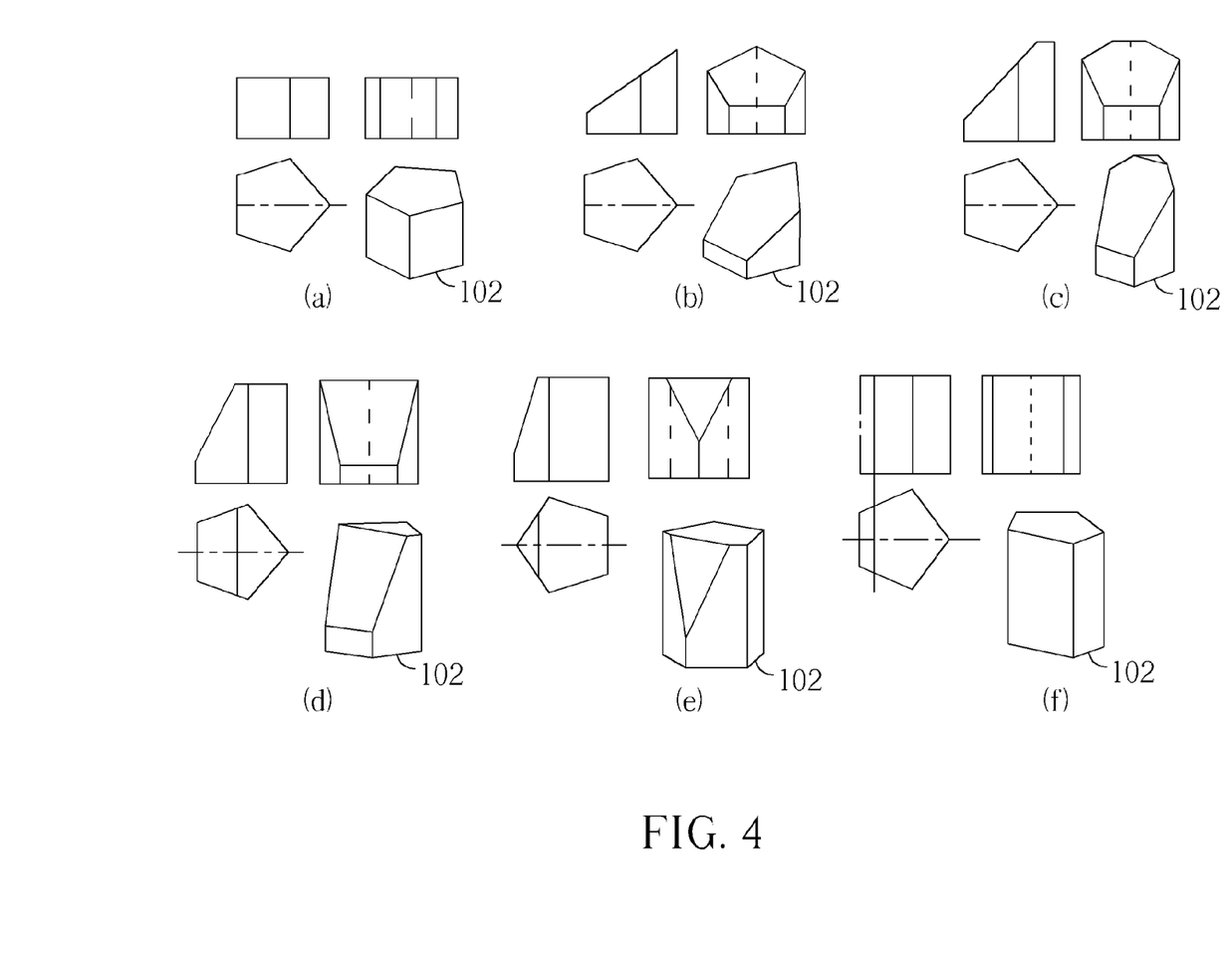
FIG. 4 illustrates candidate shapes of the sealed metal housing shown in FIG. 3 according to some embodiments of the present invention.

A shape of the sealed metal housing 102 may be an irregular geometric shape, in other words, the shape of the sealed metal housing 102 is not limited by as shown in FIG. 3. For example, in one embodiment of the present invention, the sealed metal housing 102 may be implemented with a metal polygon-shaped housing. Please refer to FIG. 4, which illustrates candidate shapes of the sealed metal housing 102 shown in FIG. 3 according to some embodiments of the present invention. Note that a shape of the sealed metal housing 102 is not limited by those shown in FIG. 4 as well, and note that interiors of the sealed metal housings 102 shown in FIG. 4 have same compositions with as shown in FIG. 3 so that said interiors are not further illustrated.

The power emitting device 106 includes at least one antenna, which may be implemented with a resonance antenna, such as a monopole antenna, a microstrip antenna, or a dipole antenna. Therefore, a shape of the power emitting device 106 is not limited by as shown in FIG. 3, as long as characteristics including lengths or materials of the power emitting device 106 meet requirements related to propagating wavelength of emitting electromagnetic wave. The power receiving device 108 may be a power-consuming electronic product capable of receiving power emitted from the power emitting device 106, such as a cell phone or a multimedia player. At least one antenna may also disposed inside the power receiving device 108 for transferring received power to energy-storing elements included by the power receiving device 108, where the at least one antenna may be implemented with a resonance antenna, which may be a monopole antenna, a microstrip antenna, or a dipole antenna, as long as characteristics including lengths or materials of the at least one antenna meet requirements related to wavelengths for receiving emitted power from the power emitting device 106. Note that in one embodiment of the present invention, the power emitted by the power emitting device 106 may also be in the form of heat transfer; therefore, the power receiving device 108 may be implemented with a heat-absorbing object so as to receive the heat transferred from the power emitting device 106. In other words, power transmission may be accomplished by heat radiation from the power emitting device 106 to the power receiving device 108, which is implemented with a heat-absorbing object. Moreover, within a same wireless power transmitting apparatus 100, numbers and disposed locations of both the power emitting device 106 and the power receiving device 108 are not limited by as shown in FIG. 3. In other words, more than one power emitting devices 106 and power receiving devices 108 may be included by the wireless power transmitting apparatus 100, and disposed locations of both the power emitting devices 106 and the power receiving devices 108 may be arbitrary locations inside the sealed metal housing 102.

Figure 5:
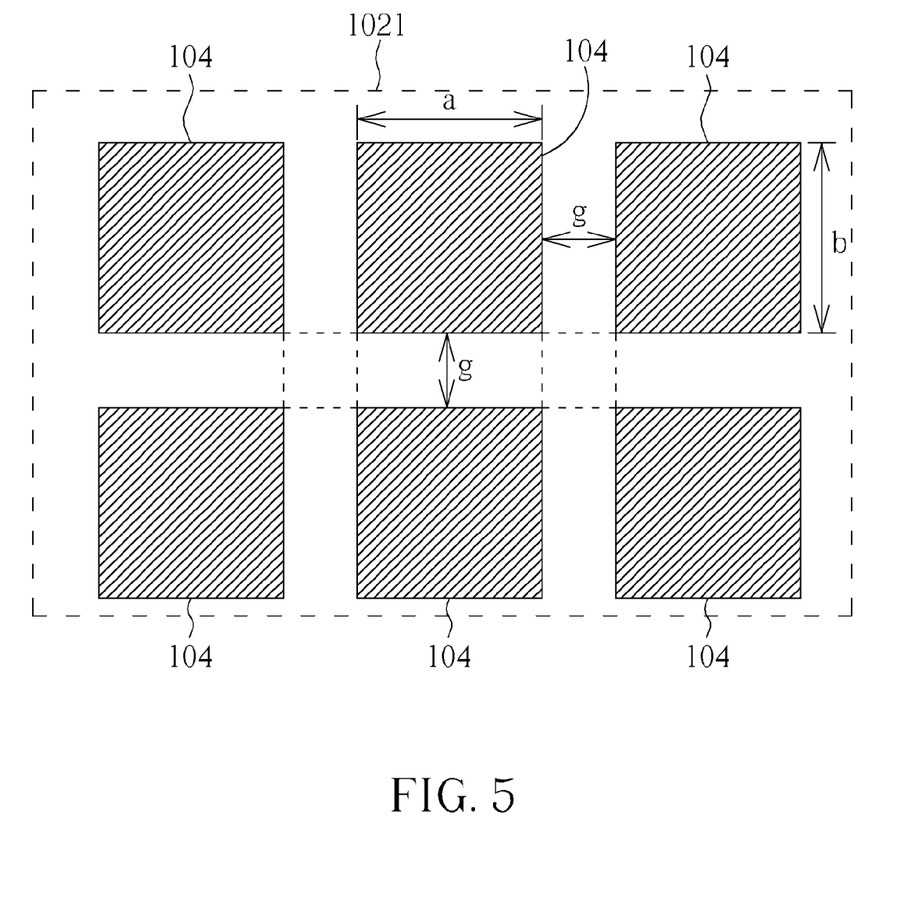
FIG. 5 schematically illustrates parts of the plurality of duplicate-distributed conductor slices on the sealed metal housing shown in FIG. 3, where the illustrated plurality of duplicate-distributed conductor slice shown in FIG. 5 correspond to a region shown in FIG. 3.
Figure 6:
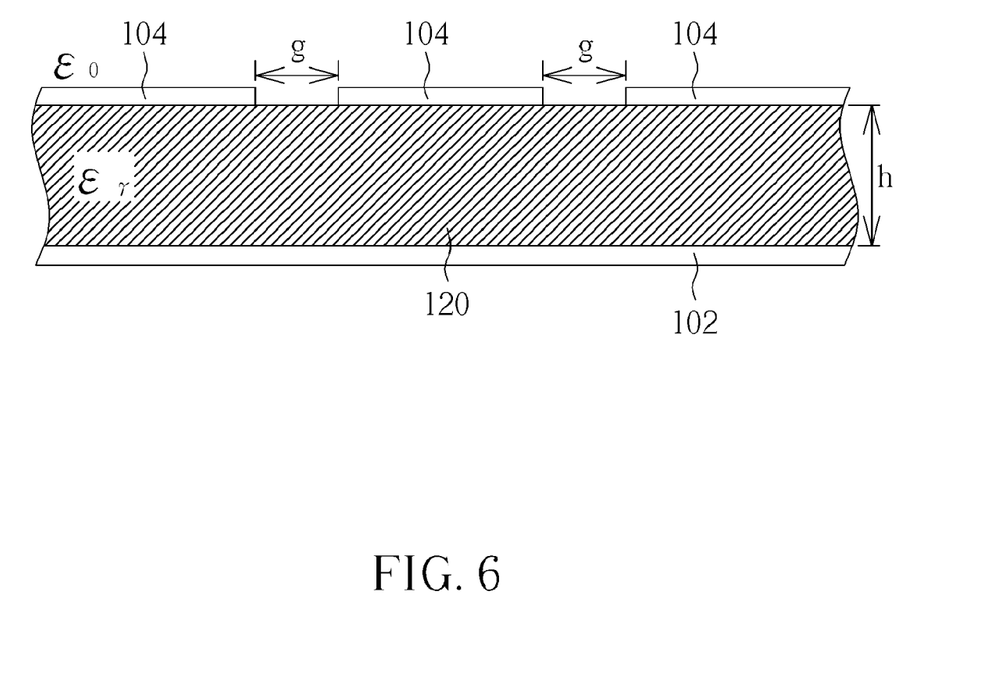
FIG. 6 illustrates relative locations between parts of the plurality of conductor slices and the sealed metal housing shown in FIG. 3, where a base plate having dielectrics is further disposed between the sealed metal housing and the illustrated plurality of conductor slices.
Figure 7:
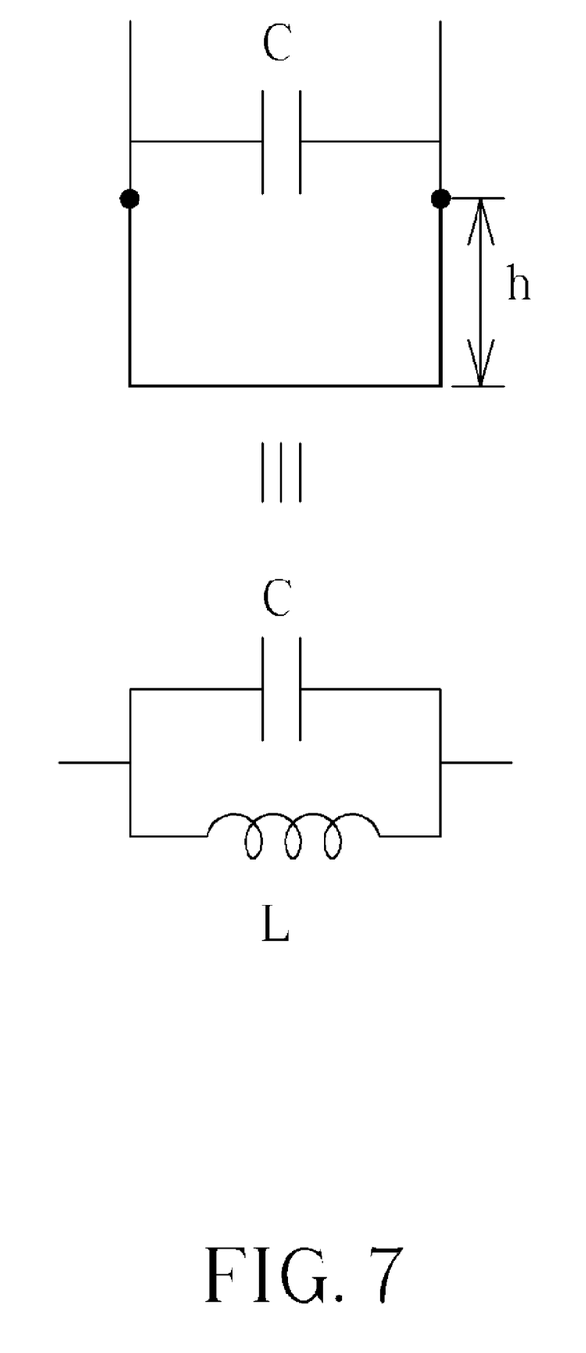
FIG. 7 is a diagram illustrating an equivalent circuit corresponding to the sealed metal housing, the plurality of conductive slices, and the base plate shown in FIG. 5 and FIG. 6.

Please refer to FIG. 5, which schematically illustrates parts of the plurality of duplicate-distributed conductor slices 104 on the sealed metal housing 102 shown in FIG. 3, where the illustrated plurality of duplicate-distributed conductor slices 104 shown in FIG. 5 correspond to a region 1021 shown in FIG. 3. Please refer to FIG. 6, which illustrates relative locations between parts of the plurality of conductor slices 104 and the sealed metal housing 102 shown in FIG. 3, where a dielectric as a base plate 120 is further disposed between the sealed metal housing 102 and the illustrated plurality of conductor slices 104. As shown in FIG. 5, the plurality of conductive slices 104 within the region 1021 are located at a same inner surface of the sealed metal housing 102; and there is a gap having a length of g between any two neighboring conductor slices 104 on the same inner surface of the sealed metal housing 102 so that the plurality of conductive slices 104 are duplicate-distributed. Each of the conductive slices 104 has a same size, i.e., a same length a and a same width b. In a preferred embodiment of the present invention, the plurality of conductive slices 104 on the inner surfaces of the sealed metal housing 102 are implemented with artificial magnetic conductors (AMC). In FIG. 6, a thickness of the base plate 120 is h, and a dielectric coefficient of the base plate 120 is $\in_r$, which may not be equivalent with the dielectric coefficient $\in_0$ of air. Since dielectric in an other side of the conductive slices 104 shown in FIG. 6 is the air existing interior to the sealed metal housing 102 so that the permittivity of the air dielectric is $\in_0$. Please refer to FIG. 7, which is a diagram illustrating an equivalent circuit corresponding to the sealed metal housing 102, the plurality of conductive slices 104, and the base plate 120 shown in FIG. 5 and FIG. 6. Note that C indicates an equivalent capacitance of the equivalent circuit, and L indicates an equivalent inductance of the equivalent circuit. As can be observed from FIG. 5 and FIG. 6, the equivalent capacitance C may be obtained by $$C = \frac{W \cdot \varepsilon_o \cdot (1 + \varepsilon_r)}{\pi} \cdot \cosh^{-1}\left(\frac{W+g}{g}\right); \tag{1}$$

W indicates an estimated width of the plurality of conductive slices 104, and may acquire a same value with a, b, or an average of both a and b. The equivalent inductance L can be approximately obtained by $$L = \mu_o \cdot h \tag{2};$$

$\mu_o$ indicates the permeability of vacuum. For generating the high impedance on both the metal sealed housing 102 and the plurality of conductive slices 104 for preventing electromagnetic power from dissipating, a phase difference between an incident wave and a reflected wave on a surface formed by both the sealed metal housing 102 and the plurality of conductive slices 104 must be 0°, i.e., a phase of a corresponding reflection coefficient has to be 0°. A reflection phase Φ on the formed surface of both the sealed metal housing 102 and the plurality of conductive slices 104 may be inducted as follows:

$$\Phi = \text{Im}\left\{\ln\left(\frac{E_{inc}}{E_{ref}}\right)\right\} = \text{Im}\left\{\ln\left(\frac{Z_s - \eta}{Z_s + \eta}\right)\right\}; \tag{3}$$

$E_{inc}$ indicates the electric field of the incident wave; $E_{ref}$ indicates the electric field of the reflected wave; $Z_s$ indicates a ratio of an electric field $E_{total}$, which is tangential to the formed surface, to an magnetic field $H_{total}$, where both the tangent electric field and magnetic field corresponding to the formed surface of the sealed metal housing 102 and the plurality of conductive slices 104. The reflection coefficient η may be indicated as:

$$\eta = \left|\frac{E_{inc}}{H_{inc}}\right| = \left|\frac{E_{ref}}{H_{ref}}\right| = \sqrt{\frac{\mu_0}{\varepsilon_0}}; \tag{5}$$

$H_{inc}$ indicates the incident magnetic field on the formed surface of the sealed metal housing 102 and the plurality of conductive slices 104. $H_{ref}$ indicates the reflected magnetic field on the formed surface of the sealed metal housing 102 and the plurality of conductive slices 104.

In the present invention, both the equivalent capacitance C and the equivalent inductance L may be determined by adjusting the length and the width of each of the plurality of conductive slices 104 (i.e., a size of each the conductive slice 104), a gap between any two neighboring of the plurality of conductive slices 104, and a thickness of the base plate 120, according to the equations (1) and (2). Moreover, the reflection phase Φ may also be determined according to the size, the shape, and the material of each of the plurality of conductive slices 104, and according to the gap between any two neighboring of said plurality of conductive slices 104. Therefore, under a resonant center frequency $\omega_0$, the magnitude $H_{total}$ of the tangential magnetic field on the surface formed by the plurality of conductive slices 104 implemented with AMC is zero, whereas the magnitude $E_{total}$ of the tangential electric field on the surface formed by the plurality of conductive slices 104 implemented with AMC is a local maximum; therefore at this time, as can be observed from FIG. 4, the ratio $Z_s$ approaches infinite, and it indicates that an infinitely-high impedance is generated on the surface formed by both the plurality of conductive slices 104 and the sealed metal housing 102 so that said formed surface approaches open-circuit. Note that the resonant center frequency $\omega_0$ may be indicated as:

$$\omega_0 = \frac{1}{\sqrt{L \cdot C}}. \tag{6}$$

In summary, reasonable variations and combinations of values of the size (i.e., the length and the width), the shape, and the material of each of the plurality of conductive slices 104, the gap of any two neighboring of the plurality of conductive slices 104, and the thickness of the base plate 120 should not be limitations to the present invention in determining values of both the equivalent capacitance C and the equivalent inductance L or in determining the reflection phase Φ. In other words, in embodiments of the present invention, both the equivalent capacitance C and the equivalent inductance L, and the reflection phase Φ, may be directly adjusted.

The wireless power transmitting apparatus 100 disclosed from FIG. 3 to FIG. 6 is used for uniformly distributing an electromagnetic field within an inner space of the sealed metal housing 102, with the aid of both the sealed metal housing 102 and the conductive slices 104. Therefore, the high impedance on the surface formed by both the sealed metal housing 102 and the plurality of conductive slices 104 prevents electromagnetic power from dissipating to an outer space of the sealed metal housing 102, and moreover, the power receiving device 108 at an arbitrary location inside the sealed metal housing 102 may receive power emitted from the power emitting device 106 with a higher efficiency. For reaching the high impedance on the formed surface, the plurality of conductive slices 104 are implemented with AMC so that the reflection coefficient corresponding to said plurality of conductive slices 104 is close to a reflection coefficient of perfect magnetic conductors (PMC). In other words, electromagnetic power incident to the plurality of conductive slices 104 is close to be entirely reflected, and power consumption on the formed surface corresponding to said plurality of conductive slices 104 is close to zero as well.

With the disclosed characteristics acquired by the wireless power transmitting apparatus 100 discussed above, electromagnetic power within the sealed metal housing 102 is prevented from dissipating or being consumed at the formed surface of the plurality of conductive slices 104. Therefore, the severe power dissipation in the prior art is significantly relieved. Besides, the conductive via used in the prior art are not required anymore in preventing electromagnetic power from dissipating and being consumed. In some preferred embodiment of the present invention, some other dispositions may also be added so that electromagnetic power emitted by the power emitting device 106 may be received by receiving antennas of the power receiving device 108 with a higher efficiency.

Figure 8:
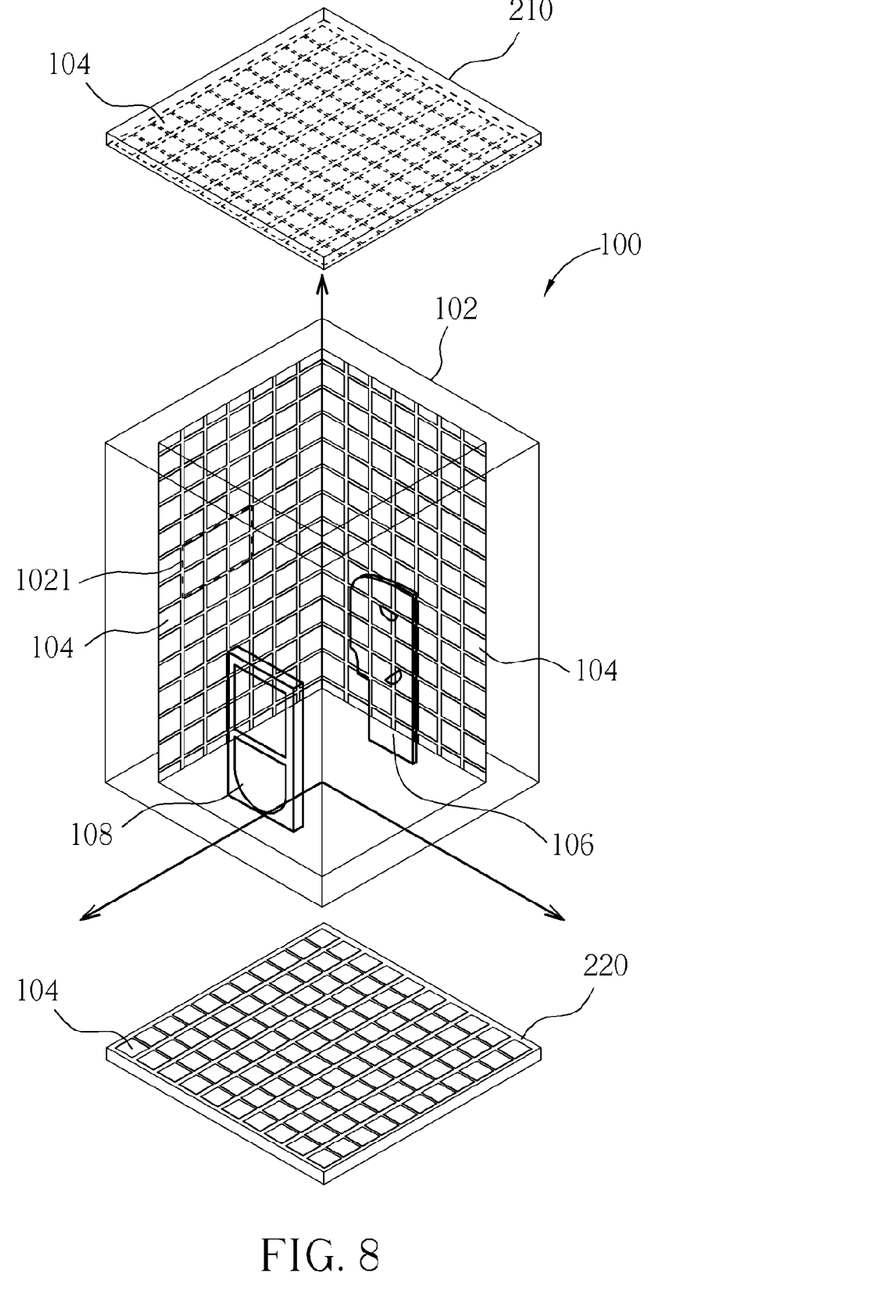
FIG. 8 illustrates a plurality of duplicate-distributed conductive slices disposed at the inner sides of both the upper case and the lower case shown in FIG. 3.

For example, a plurality of conductive slices 104 may further be disposed on the inner sides of both the upper case 210 and the lower case 220 besides the side walls of the sealed metal housing 102, where the plurality of conductive slices 104 disposed on the upper case 210 and the lower case 220 may be implemented with perfect electric conductors (PEC). Please refer to FIG. 8, which illustrates a plurality of duplicate-distributed conductive slices 104 disposed at the inner sides of both the upper case 210 and the lower case 220 shown in FIG. 3. Note that the plurality of conductive slices 104 disposed at the inner side of the upper case 210 in a transparent view in FIG. 8. With the aid of the plurality of conductive slices 104 disposed at the inner sides of both the upper case 210 and the lower case 220, power emitted from the power emitting device 106 may be better constrained within the sealed metal housing 102. Therefore, tiny power brought by incident electromagnetic waves on the inner side of the upper case 210 or the lower case 220 may be completely and uniformly constrained within the sealed metal housing 102 with the aid of the plurality of conductive slices 104, which are implemented with conductor, on the inner sides of both the upper case 210 and the lower case 220.

Note that detachable parts of the sealed metal housing 102 are not limited to the upper case 210 and the lower case 220 shown in FIG. 3. In some embodiments of the present invention, any side wall of the sealed metal housing 102 may also be disposed in a detachable manner for placing the power receiving device 108 within the sealed metal housing 102.

Figure 9:
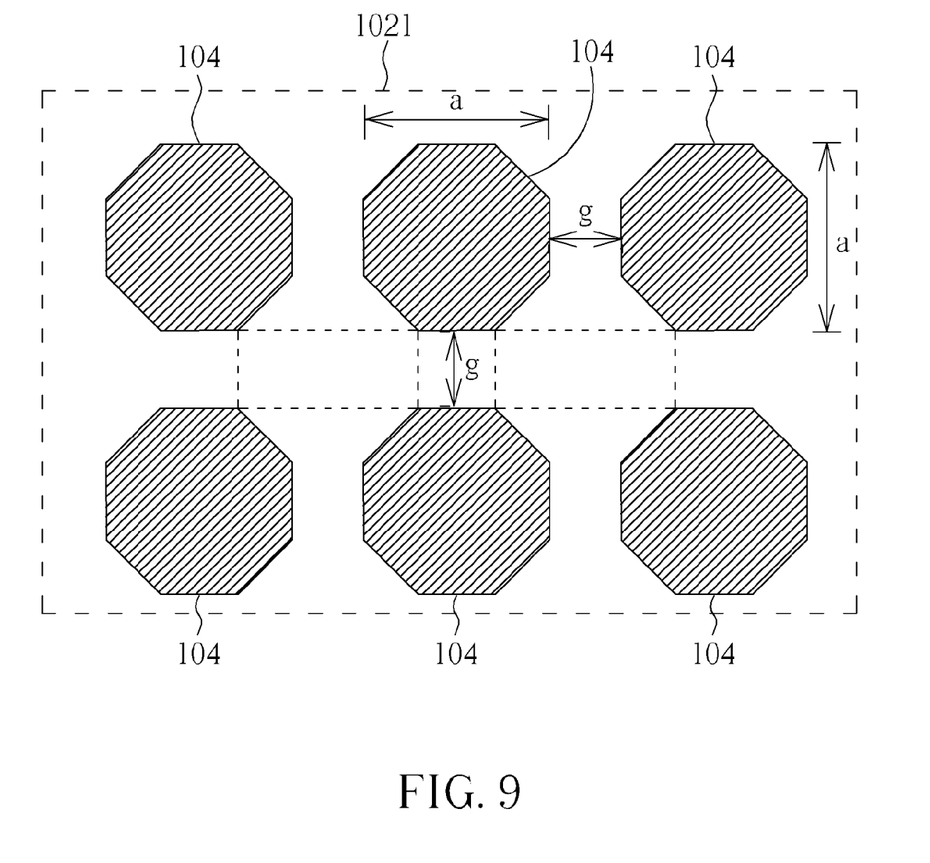
FIG. 9 illustrates a plurality of regular-hexagon-shaped and duplicate-distributed conductive slices.

A shape of the plurality of duplicate-distributed conductor slices 104 is not limited to quadrilaterals shown in FIG. 3 and FIG. 5. In some embodiments of the present invention, other polygonal shapes may also be applied on the conductive slices 104. Please refer to FIG. 9, which illustrates a plurality of regular-hexagon-shaped and duplicate-distributed conductive slices 104. As shown in FIG. 9, each of the plurality of conductive slices 104 has a width a, and any two neighboring of said plurality of conductive slices 104 has a fixed gap g. Note that a size, material, and a gap corresponding to each of the plurality of conductive slices 104 shown in FIG. 9 may be adjusted so as to meet requirements related to the abovementioned equivalent capacitance, the equivalent inductance, the reflection phase, and further, the high impedance of the formed surface corresponding to the plurality of conductive slices 104.

Though in FIG. 6, a base plate 120 is disposed between the sealed metal housing 102 and the plurality of conductive slices 104 for enhancing both the equivalent capacitance and the equivalent inductance so as to generate the required high impedance, said high impedance may still be generated on the formed surface without the base plate 120 in most embodiments of the present invention. Under such a condition, the relative permittivity $\in_r$ of the base plate 120 is replaced by the $\in_0$, the relative permittivity of air in equation (1).

Figure 10:
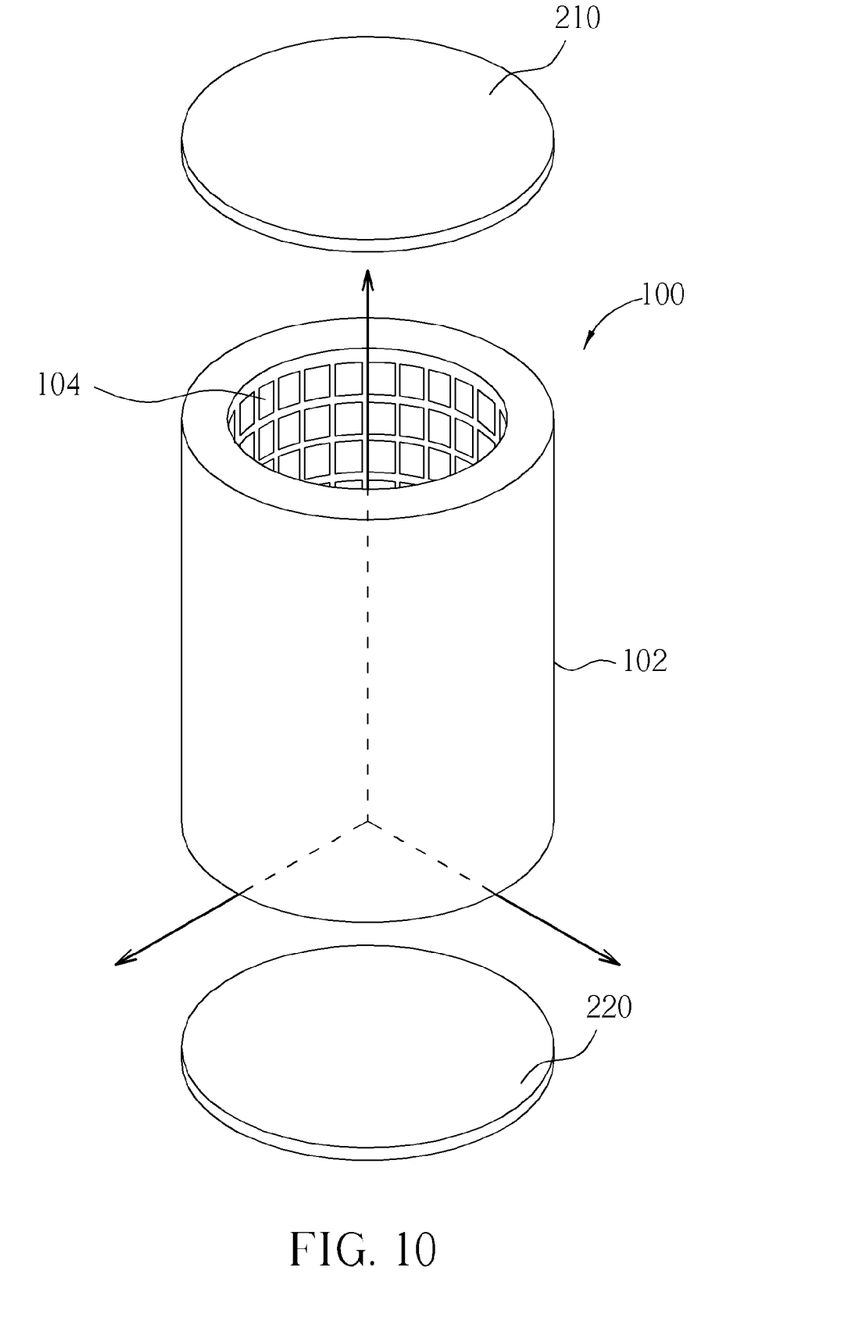
FIG. 10 illustrates using a cylinder housing for implementing the sealed metal housing shown in FIG. 3.
Figure 11:
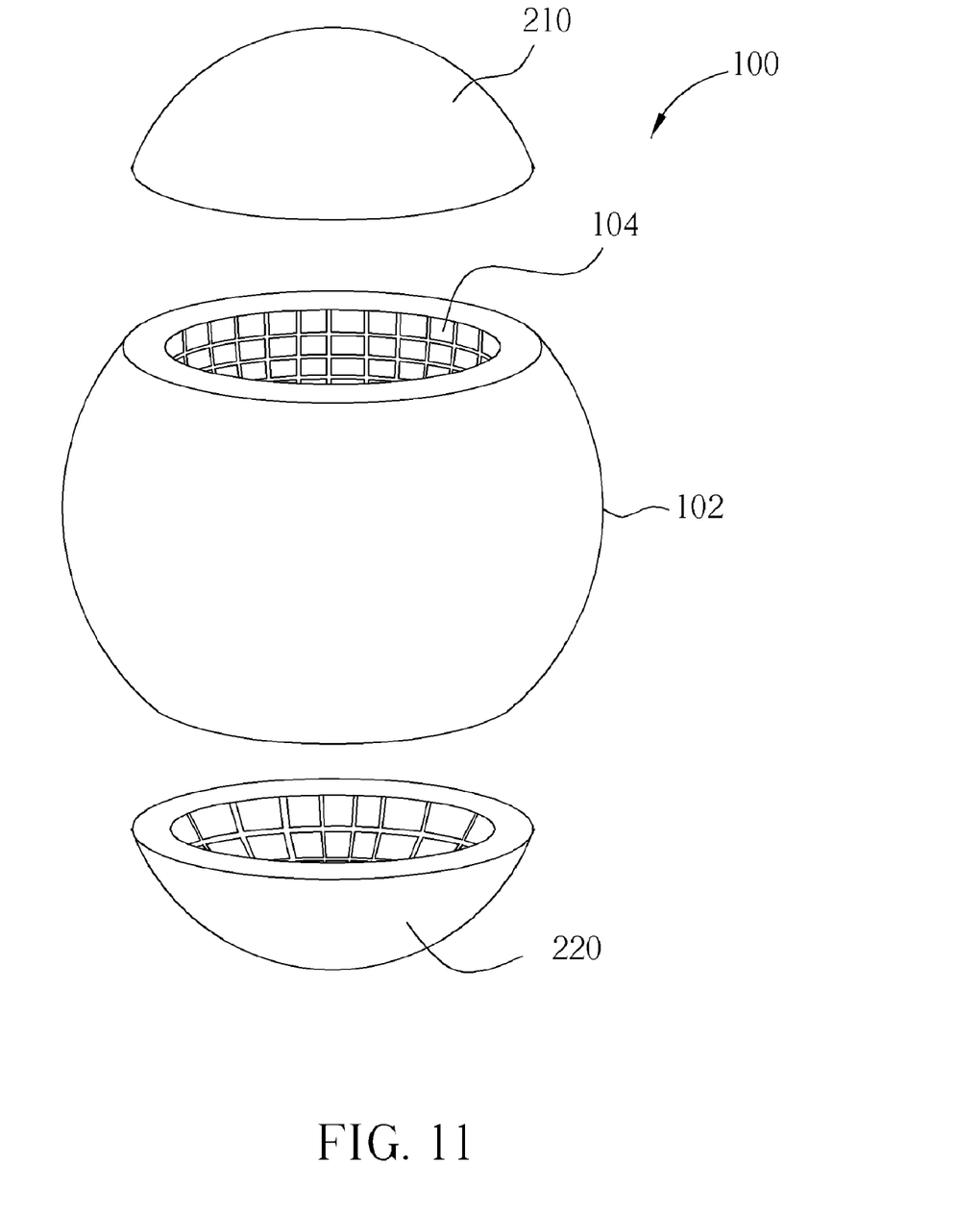
FIG. 11 illustrates using a sphere housing for implementing the sealed metal housing shown in FIG. 3.

In summary, in preferred embodiments of the present invention, performance achieved by using quadrilateral-shaped pillar on the sealed metal housing 102 may also be achieved by using irregular-shaped geometric objects on said sealed metal housing 102, for example, a pentagon-shaped pillar, a hexagon-shaped pillar, a cylinder, or a sphere, as long as the used plurality of duplicate-distributed conductive slices 104 on the sealed metal housing 102 fulfill the high impedance on inner surfaces of the sealed metal housing 102, where disposition of the plurality of conductive slices 104 corresponding to the sealed metal housing 102 has been disclosed in descriptions and drawings related to FIG. 5 and FIG. 6. Moreover, inner surfaces of both the upper case 210 and the lower case 220 may still be disposed with a plurality of conductive slices 104 implemented with PEC for generating the required high impedance. Please refer to FIG. 10 and FIG. 11. FIG. 10 illustrates a cylinder housing for implementing the sealed metal housing 102 shown in FIG. 3. FIG. 11 illustrates a sphere housing for implementing the sealed metal housing 102 shown in FIG. 3. Though the used plurality of conductive slices 104 shown in FIG. 10 and FIG. 11 are also quadrilateral-shaped, the used plurality of conductive slices 104 may still be implemented with duplicate-distributed conductive slices 104 having other irregular geometric shapes as long as the required high impedance may thereby be generated.

In certain preferred embodiments of the present invention, disposed locations of both the power emitting device 106 and the power receiving device 108 are not limited to locations as shown in FIG. 3, as long as the disposed locations are interior to the sealed metal housing 102. When the disposed locations of both the power emitting device 106 and the power receiving device 108 are corresponding with each other, receiving antennas of the power receiving device 108 is capable of receiving power emitted from the power emitting device 106 with a highest efficiency, where said corresponding disposed locations may be inducted according to electromagnetic field distribution inside the sealed metal housing 102. However, even if both the disposed locations are not perfectly corresponding with each other, the power receiving efficiency is still highly close to the highest efficiency.

Notably, to enhance power reception of the power receiving device 108, certain preferred embodiments of the present invention use receiving antennas of various types of bandwidths, and the power emitting device 106 may be implemented with a monopole antenna having a larger bandwidth. Besides, while the power emitting device 106 is implemented with a dipole or a microstrip antenna with compact size, the required volume of the power emitting device 106 may also be significantly reduced.

The present invention discloses a wireless power transmitting apparatus for remotely transmitting power from a power emitting device to a power receiving device. The disclosed wireless power transmitting apparatus is implemented with a sealed metal housing and a plurality of duplicate-distributed conductive slices disposed at inner surfaces of the sealed metal housing. High impedance is generated on a formed surface of the plurality of conductive slices, for preventing electromagnetic power inside the sealed metal housing from dissipating and being consumed. In comparison of the wireless power transmitting apparatus using a open structure or using conductive via as ground lines, the wireless power transmitting apparatus of the present invention effectively constrains electromagnetic power inside its sealed metal housing with the aid of the generated high impedance, and saves costs in additional conductive via.

Those skilled in the art will readily observe that numerous modifications and alterations of the device and method may be made while retaining the teachings of the invention.

What is claimed is:

1. A wireless power transmitting apparatus comprising:
    a metal housing having an irregular geometric shape;
    a plurality of duplicate-distributed conductor slices disposed on a plurality of inner surfaces of the metal housing;
    at least one power emitting device disposed at an inner side of the metal housing for wirelessly transmitting power; and at least one power receiving device disposed at the inner side of the metal housing for receiving transmitted power from the power emitting device, the at least one power receiving device comprising:

at least one energy storage element for storing power received by the at least one power receiving device.

2. The wireless power transmitting apparatus of claim 1 wherein the metal housing comprises:

an upper case;
a lower case; and
a plurality of side walls;
wherein the plurality of inner surfaces, on which the plurality of duplicate-distributed conductor slices are disposed, are located at the plurality of side walls.

3. The wireless power transmitting apparatus of claim 2 wherein the upper case is disposed on the metal housing in a detachable manner.

4. The wireless power transmitting apparatus of claim 2 wherein the lower case is disposed on the metal housing in a detachable manner.

5. The wireless power transmitting apparatus of claim 2 wherein at least one of the plurality of side walls is disposed on the metal housing in a detachable manner.

6. The wireless power transmitting apparatus of claim 1 wherein the plurality of conductor slices are implemented with a plurality of polygon-shaped conductor slices.

7. The wireless power transmitting device of claim 1 wherein there is a gap between any two neighboring conductor slices on a same inner surface of the metal housing.

8. The wireless power transmitting device of claim 2 wherein the metal housing is a pillar-shaped metal housing; wherein the pillar-shaped metal housing, the upper case and the lower case form a polygon-shaped structure, and the upper case and the lower case are symmetric with each other in shape.

9. The wireless power transmitting apparatus of claim 8 wherein the plurality of conductor slices disposed on the inner surfaces located on the plurality of side walls of the metal housing are implemented with artificial magnetic conductors (AMC).

10. The wireless power transmitting apparatus of claim 8 wherein a plurality of conductor slices are disposed on an inner surface of each of the upper case and the lower case.

11. The wireless power transmitting apparatus of claim 10 wherein the plurality of conductor slices disposed on the inner surface of each of the upper case and the lower case are implemented with perfect electric conductors (PEC).

12. The wireless power transmitting apparatus of claim 2 wherein the metal housing is a partial sphere-shaped housing.

13. The wireless power transmitting apparatus of claim 12 wherein the metal housing, the upper case and the lower case form a sphere-shaped housing, and the upper case and the lower case are symmetric with each other in shape.

14. The wireless power transmitting apparatus of claim 13 wherein the plurality of conductor slices disposed on the inner surfaces located on the plurality of side walls of the metal housing are implemented with artificial magnetic conductors (AMC).

15. The wireless power transmitting apparatus of claim 13 wherein the plurality of conductor slices disposed on the inner surface of each of the upper case and the lower case are implemented with perfect electric conductors (PEC).

16. The wireless power transmitting apparatus of claim 1 wherein the power receiving device and the power emitting device are disposed at a location inside the metal housing;

wherein the location of the power receiving device is corresponding to the location of the power emitting device inside the metal housing;

wherein the locations of both the power transmitting device and the power receiving device inside the metal housing are determined according to electromagnetic field distribution interior to the metal housing.

17. The wireless power transmitting device of claim 1 wherein a base plate is disposed between each one of the plurality of inner surfaces of the metal housing, on which the plurality of conductor slices are disposed.

18. The wireless power transmitting apparatus of claim 14 wherein a reflection phase on each of the plurality of inner surfaces of the metal housing is adjusted by adjusting a gap between any two neighboring conductor slices on the plurality of inner surfaces of the metal housing, a size of the plurality of conductor slices, a shape of the plurality of conductor slices, or material for the plurality of conductor slices.

19. The wireless power transmitting apparatus of claim 1 wherein the power emitting device comprises at least one antenna.

20. The wireless power transmitting apparatus of claim 19 wherein the antenna is implemented with a resonant antenna.

21. The wireless power transmitting apparatus of claim 20 wherein the resonant antenna for implementing the antenna is a monopole antenna, a microstrip antenna, or a dipole antenna.

22. The wireless power transmitting apparatus of claim 1 wherein the power receiving device further comprises at least one antenna for conducting received power into the energy storage elements.

23. The wireless power transmitting apparatus of claim 1 wherein the power emitting device emits power to the power receiving device in forms of heat transfer;

wherein the power receiving device is implemented with a heat-absorbing object for receiving the emitted power from the power emitting device by heating the heat-absorbing object with the received power.

24. The wireless power transmitting apparatus of claim 22 wherein the antenna is implemented with a resonant antenna.

25. The wireless power transmitting apparatus of claim 24 wherein the resonant antenna for implementing the antenna is a monopole antenna, a microstrip antenna, or a dipole antenna.

26. The wireless power transmitting apparatus of claim 8 wherein the pillar-shaped metal housing is a quadrilateral pillar-shaped housing.

27. The wireless power transmitting apparatus of claim 2 wherein the metal housing is a cylinder-shaped housing.

28. The wireless power transmitting apparatus of claim 27 wherein the upper case and the lower case are circular-shaped and are symmetric to each other in shape.

* * * * *